United States Patent
James

(10) Patent No.: US 7,708,259 B2
(45) Date of Patent: May 4, 2010

(54) SELF-STANDING WEIGHTED DIFFUSER ASSEMBLY

(76) Inventor: Jesse Alan James, 7777 E 900th Ave., Newton, IL (US) 62448

(*) Notice: Subject to any disclaimer, the term of this patent is extended or adjusted under 35 U.S.C. 154(b) by 721 days.

(21) Appl. No.: 11/710,340

(22) Filed: Feb. 23, 2007

(65) Prior Publication Data
US 2008/0203006 A1 Aug. 28, 2008

(51) Int. Cl.
*B01F 3/04* (2006.01)
(52) U.S. Cl. .............. 261/122.1; 261/123; 261/DIG. 70
(58) Field of Classification Search .............. 261/122.1, 261/123, 124, DIG. 70
See application file for complete search history.

(56) References Cited

U.S. PATENT DOCUMENTS

| | | | |
|---|---|---|---|
| 3,627,135 A | | 12/1971 | Goodman |
| 3,741,393 A | | 6/1973 | Estes et al. |
| 3,819,054 A | | 6/1974 | Long et al. |
| 3,923,657 A | | 12/1975 | Roser |
| 4,051,035 A | * | 9/1977 | Boschen et al. ............. 210/220 |
| 4,179,375 A | | 12/1979 | Smith |
| 4,488,508 A | * | 12/1984 | Heideman ................... 119/215 |
| 4,820,457 A | * | 4/1989 | Jager .......................... 261/120 |
| 4,849,101 A | * | 7/1989 | Desjardins ............. 210/170.06 |
| 5,376,311 A | * | 12/1994 | DeGuzman .................. 261/77 |
| 5,609,754 A | | 3/1997 | Stuth |
| 5,690,864 A | * | 11/1997 | Tyer ........................ 261/122.1 |
| 5,851,448 A | * | 12/1998 | Tyer ........................ 261/122.1 |
| 5,938,983 A | * | 8/1999 | Sheaffer et al. .......... 261/122.1 |
| 6,032,931 A | * | 3/2000 | Plunkett ....................... 261/77 |
| 6,245,237 B1 | | 6/2001 | Blough et al. |

(Continued)

*Primary Examiner*—Scott Bushey
(74) *Attorney, Agent, or Firm*—John F. Watson; R. Sean Hocking; Craig & Craig Attorneys

(57) ABSTRACT

An apparatus designed to convert the dynamic of residential wastewater treatment processing bacteria from anaerobic to aerobic bacteria in existing single or multiple compartment septic tanks. The apparatus consists of a small self-standing weighted diffuser assembly designed with a center tube having a specific series of vertically lined orifices and a deflector plate that can be lowered through an 8-inch diameter opening by means of the attached flexible airline into an existing septic tank and sit directly on the bottom of the septic tank. A flexible airline attaches the diffuser assembly to a small air pump located outside of the septic tank. When the air pump is activated, air will enter the diffuser assembly and discharge through the orifices a combination of fine and coarse air bubbles. This action causes the wastewater to be forced against the deflector plate and creates a rolling action starting at the bottom of the septic tank and rolling upwards toward the outside of the tank. This rolling wastewater is forced to the top of the liquid level in the septic tank and then is pulled back down to the bottom and back toward the diffuser where the cycle begins again. This unique action takes place on all sides of the diffuser assembly very quickly breaking solids down into small particles. Additional benefits include the production of sufficient oxygen in the wastewater to proliferate the growth of aerobic bacteria. With the constant rolling action of sewage and particles, it is necessary especially in a single compartment septic tank to eliminate those particles from exiting the tank and entering into the secondary treatment system. The apparatus is designed to draw those small waste particles down and away from the septic tank discharge point, and back toward the diffuser assembly ensuring those particles do not exit the septic tank.

5 Claims, 2 Drawing Sheets

U.S. PATENT DOCUMENTS

| | | |
|---|---|---|
| RE39,203 E | 7/2003 | McKinney |
| 6,884,353 B2 | 4/2005 | Hoage et al. |
| 6,887,383 B2 | 5/2005 | Potts |
| 6,923,905 B2 | 8/2005 | Potts |
| 6,942,800 B2 | 9/2005 | Jungbauer |
| 6,949,187 B2 | 9/2005 | Smith |
| 7,267,328 B2 * | 9/2007 | Witheridge ............... 261/77 |
| 7,513,995 B2 * | 4/2009 | James ....................... 210/220 |
| 2004/0149652 A1 | 8/2004 | Holt |

* cited by examiner

SELF-STANDING WEIGHTED DIFFUSER ASSEMBLY

CROSS REFERENCE TO RELATED APPLICATIONS

None.

FEDERALLY SPONSORED RESEARCH AND DEVELOPMENT

None.

PARTIES TO A JOINT RESEARCH AGREEMENT

None.

REFERENCE TO MICROFICHE APPENDIX CONTAINING A COMPUTER PROGRAM

None.

BACKGROUND OF THE INVENTION

The most common type of septic system used throughout the United States consists of a septic tank with some form of secondary treatment system, usually a subsurface seepage system. These types of systems use anaerobic bacteria that naturally grow inside the septic tank to slowly break down waste causing the larger particles and sludge to settle and remain on the bottom of the tank. Raw sewage, mixed with small particles is allowed to exit the septic tank and enter into a secondary treatment system where the cleaning process is continued. In many cases a buildup of anaerobic bacteria, raw sewage, and small particles occurs in the secondary treatment system causing premature failure of those systems. These types of systems need routine tank pumping usually every 3 years.

The claimed self-standing weighted diffuser assembly converts an anaerobic septic system into an aerobic system by pumping air into the effluent. Aerobic systems have been in use throughout the United States for more than 40 years. Aerobic systems and the use of aerobic bacteria to treat residential wastewater have been proven to be much more effective than septic tanks utilizing anaerobic bacteria. There are many advantages of processing wastewater inside the main tank by means of the aerobic process before exiting into some form of secondary treatment system. Many aerobic systems have been proven to produce clear and odorless discharges that will be less likely to contaminate groundwater and greatly prolong the life of a secondary treatment system. The effluent produced by this process is of a high enough quality that some states allow these types of clear and odorless discharges to directly discharge to the ground surface through some type of open pipe or spray irrigation.

The use of an air pump to introduce air into the septic tank is similar in design to some existing United States patented products such as Goodman, U.S. Pat. No. 3,627,135, Long, U.S. Pat. No. 3,819,054, Stuth, U.S. Pat. No. 5,609,754, and Estes, U.S. Pat. No. 3,741,393; however, the claimed apparatus consists of several unique and individual characteristics specific only to this apparatus. The self-standing weighted diffuser assembly does more than introduce air into a septic tank to proliferate the growth of aerobic bacteria. The claimed apparatus can easily and quickly be installed into existing septic tanks through a pre-existing opening as small as 8-inches in diameter. While the claimed apparatus is distributing a combination of coarse and fine air diffusion, the rotating motion of the wastewater caused by this air introduction bouncing off of a deflection plate is specifically intended to create a designed rolling action that will break waste down into small particles very quickly as well as draw those waste particles down and away from the existing septic tank's discharge point.

It is the purpose of this invention to take advantage of the aerobic technologies available and convert them for use in an existing septic tank. There exist a few apparatuses patented, such as Goodman, U.S. Pat. No. 3,627,135, Long, U.S. Pat. No. 3,819,054, Stuth, U.S. Pat. No. 5,609,754, and Estes, U.S. Pat. No. 3,741,393, that introduce air into an existing septic tank to promote the growth of aerobic bacteria. These types of systems, although similar in the means of introducing air through a small air pump into an existing septic tank, are different in substance in how they work and the effectiveness of their functionality in a single compartment septic tank. Existing single compartment septic tanks that have already been manufactured and buried beneath the ground surface are limited in accessibility. Many of these tanks are constructed of concrete, fiberglass, or roto-molded plastics.

Goodman, U.S. Pat. No. 3,627,135, Long, U.S. Pat. No. 3,819,054, and Hoage, U.S. Pat. No. 6,884,353 B2, require major excavation and large openings in the top of the existing septic tank to allow installation of those patented inventions. Constructing larger openings in these tanks for the installation of new equipment would potentially structurally weaken an already aged septic tank that may have been buried for years and has continually been subjected to hydrostatic pressures created by high ground waters. Some inventions in this field, such as Stuth, U.S. Pat. No. 5,609,754, Hoage, U.S. Pat. No. 6,884,353 B2, Long, U.S. Pat. No. 3,819,054, Goodman, U.S. Pat. No. 3,627,135, and Blough, U.S. Pat. No. 6,245,237 B1, introduce air into the septic tank but do not create significant circulation and movement in the wastewater to break down solids quickly. Also, Hoage, U.S. Pat. No. 6,884,353 B2 and Blough, U.S. Pat. No. 6,245,237 B1 have mechanical moving parts as part of the elements of their design.

The claimed apparatus is designed to fit into existing openings in existing septic tanks without structurally weakening the tanks by manufacturing larger openings. The claimed apparatus improves upon prior art by imparting a specific mode of circulation which produces a rolling action of the wastewater within the septic tank. When the air pump is activated, air enters the diffuser assembly and discharges a combination of fine and coarse air bubbles through the orifices. This action causes the wastewater to be forced against the deflector plate and creates a rolling action of the wastewater starting at the bottom of the septic tank and rolling upwards toward the outside of the tank. This rolling wastewater is forced to the top of the liquid level in the septic tank and is then pulled back down to the bottom and back toward the diffuser where the cycle begins again. This unique action takes place on all sides of the diffuser assembly and causes all biodegradable waste to be broken down into small particles very quickly, usually within a few minutes after entering the existing septic tank. This rolling action is particularly beneficial in single compartment septic tanks in which the rolling action helps draw waste and particles away from the discharge end of a septic tank and back to the diffuser assembly. Additional benefits include the production of sufficient oxygen in the wastewater to enhance the proliferation of aerobic bacteria. By achieving constant movement of this wastewater throughout the existing septic tank, the claimed apparatus causes the rapid breaking down of all solids entering the septic tank into small particles, and also promotes the attachment of bacteria to those small floating and moving particles.

The attachment of aerobic bacteria to those small particles enhances the final breakdown and elimination of those particles which will usually occur within 24 hours because of this specific mode of circulation of the wastewater.

One of the most important aspects of the invention was the consideration given to maintenance on key components located within and below the sewage level in the septic tank. Maintenance on the apparatus is relatively minor. The diffuser assembly has no moving parts and should not need to be removed and cleaned. However removal of this diffuser would be simple and quick, since it is attached to a flexible airline and could be lifted out of the tank as warranted.

The apparatus is designed to be installed in individual onsite existing residential septic tank systems. Treatment of larger volumes of residential wastewater can be achieved with the addition of larger or multiple air pumps and multiple diffuser assemblies. The apparatus will treat 150 gallons of residential wastewater with each cubic foot of air that is introduced through the diffuser assembly. For example, three cubic feet of air would treat 450 gallons of residential wastewater per day, which would be considered an average normal residential application. Each individual diffuser assembly is capable of introducing up to and a maximum of 7 cubic feet of air per minute into the wastewater in a residential septic tank. Multiple diffuser assemblies can be added to meet specific needs. Additionally although the apparatus has been designed to effectively process residential wastewater in a single compartment septic tank, the apparatus will also process residential wastewater in multiple compartment septic tanks as well.

BRIEF SUMMARY OF THE INVENTION

An apparatus for the introduction of air into an existing single compartment septic tank that is delivered from an air pump and then passes through a self-standing weighted diffuser assembly, producing a combination of coarse and fine air diffusion, causing a continuous rolling action of the residential wastewater and by this movement rapidly breaking down all biodegradable solids entering the septic tank, usually within a matter of a few minutes. Due to the introduction of both coarse and fine air diffusion, aerobic bacteria will proliferate, aiding attachment of the bacteria to the broken down particles of biodegradable solids by the continuous wastewater rolling action created by the diffuser assembly and a deflection plate. This rolling action draws the broken down and moving particles away from the septic tank discharge baffle or septic tank filter assembly preventing premature filter failure, while providing for much longer time frames between filter cleaning as well as producing more oxygen by the septic tank discharge point that would freely enter into the secondary treatment system. These activities should prolong the life of the secondary treatment system and in many instances rejuvenate those septic systems as a whole. On existing septic tanks without a septic tank filter located on the outlet line, the rolling action drawing all the broken down small particles away from the discharge point would be particularly beneficial in eliminating the chances of those particles exiting the septic tank and potentially creating clogging problems in the secondary treatment system. The apparatus is simple and inexpensive to install and operate.

BRIEF DESCRIPTION OF ANY DRAWINGS

DETAILED DESCRIPTION OF THE INVENTION

Figure 1:
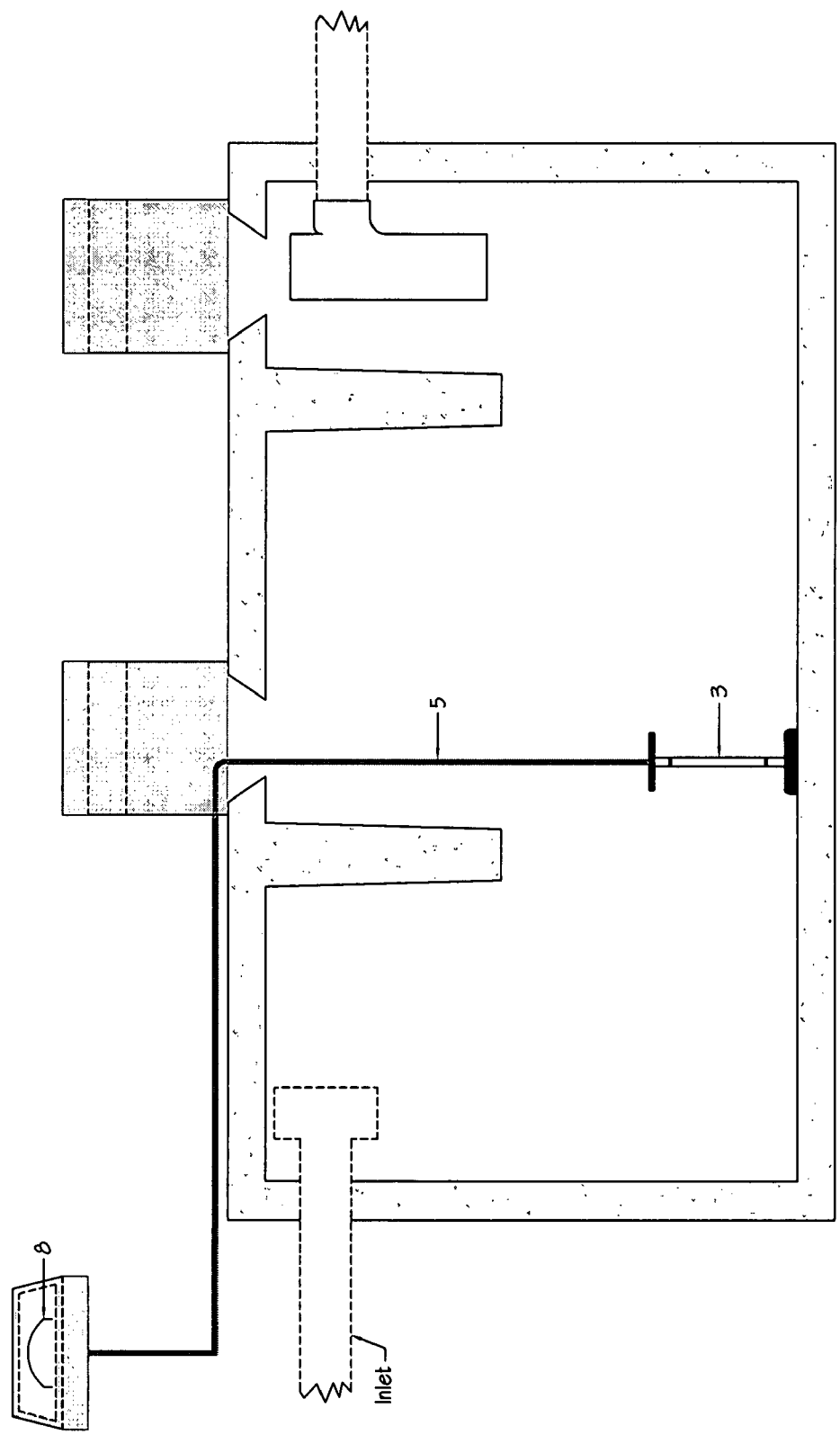
FIG. 1 is a cross-sectional view of an assembled septic system tank containing the self-standing weighted diffuser assembly.

As seen in FIG. 1, the invention is designed to allow those homeowners with existing single compartment septic tank systems to easily and inexpensively convert their septic tank systems from a process using anaerobic bacteria to a much more effective process using aerobic bacteria. The apparatus is designed to fit into the existing opening of an existing septic tank without structurally weakening the tank by manufacturing a larger opening.

Figure 2:
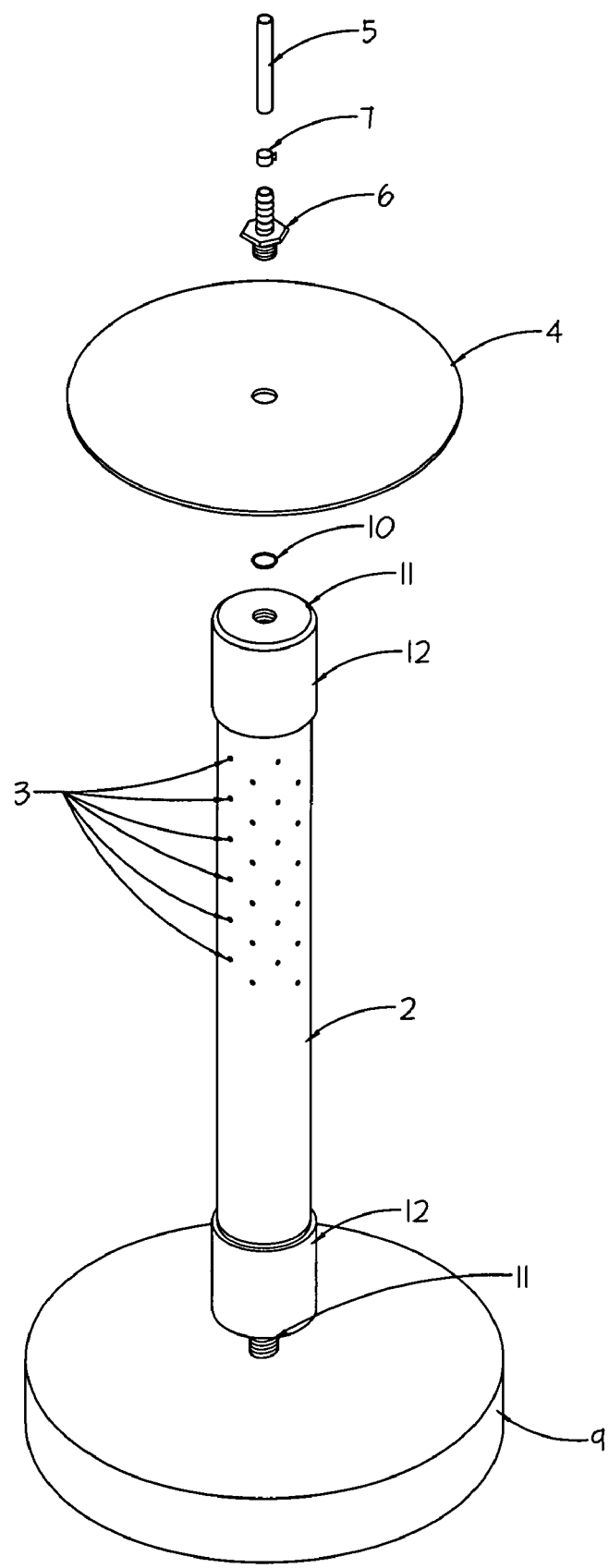
FIG. 2 is a pictorial view of the self-standing weighted diffuser assembly in its preferred embodiment.

As illustrated in FIG. 2, the apparatus is comprised of a self-standing weighted diffuser assembly (1) designed with center tube (2) having a series of orifices (3) and a deflector plate (4) that can be lowered through an 8-inch diameter opening into an existing septic tank and sit directly upright on the tank bottom. One end of a flexible airline (5) is attached to the top portion of the diffuser assembly (1) by means to connect the flexible airline to the deflector plate (4) and center tube (2), such as a ½" male adapted (6) along with a stainless steel clamp (7). The flexible airline (5) can be used to lower the diffuser assembly into the existing septic tank. The other end of the airline will be attached to a small air pump (8) as depicted in FIG. 1. When the air pump is activated, air will enter the diffuser assembly and discharge through the series of orifices (3) in a combination of fine and coarse air bubbles. The entire apparatus is constructed to be self-standing by the use of a 8" diameter weight (9) connected to the bottom portion of the center tube (2) by some means of attaching said weight and said center tube.

Testing and experimentation has revealed the best mode contemplated which includes four sets or 12 holes with a diameter or 3/32" having a spacing of ½" apart that appropriately serve as the series of orifices (3) in the center tube (2) to create the desired rolling action of the wastewater starting at the bottom of the septic tank and rolling upwards toward the outside of the tank. Also, testing and experimentation has revealed that the best mode of the invention includes a deflection plate (4) which is flat and circular, having a 4¾ diameter that works well with the two sets or 12 holes serving as the series of orifices (3) to create the desired rolling action of the wastewater. Models that have been reduced to practice have used a 1¼" PVC tube with a length of 13" as the center tube (2) with the use of two 1¼" by ¾" PVC bushings (11) connected to two 1¼" PVC couplings (12), all glued together, to seal off the center tube to provide an air tight center tube which allows the pressurized air to escape only from the series of orifices (3) which are drilled or punctured into the center tube.

The use of a hose washer seal (10) has been used to create an airtight connection between the deflection plate (4) and the center tube (2) which allows the air to be expelled solely from the center tube or the weight (9) if a porous element is used such as an air stone.

I claim:

1. A self-standing weighted diffuser assembly apparatus comprising;

an air pump providing a positive air pressure to the diffuser assembly apparatus;

an air supply line hydraulically connected to said air pump and to the diffuser assembly apparatus;

a center tube with a series of orifices to allow air to escape the interior of said tube;

an air deflection disc located at the upper portion of the center tube;

means for mechanically connecting the air supply line to the air deflection disc and the center tube, and for hydraulically connecting the air supply line to the center tube which allows the positive air pressure to travel from said air pump, through said air supply line to said center tube;

a weight located at the bottom portion of the center tube, means for connecting the weight to the bottom portion of said center tube.

2. The weighted diffuser assembly apparatus of claim 1, wherein said air deflection disc is flat and circular, having a 4¾" diameter.

3. The weighted diffuser assembly apparatus of claim 1, wherein said center tube is a 1¼" PVC tube having a length of 13" in which the series of orifices in said center tube are four sets of 12 holes with a diameter of 3/32" having a spacing ½" apart.

4. The weighted diffuser assembly apparatus of claim 1, wherein said means for mechanically connecting the air supply line to the air deflection disc and the center tube, and for hydraulically connecting the air supply line to the center tube is a ½" male adapter.

5. The weighted diffuser assembly apparatus of claim 1, wherein said weight located at the bottom portion of the center tube is a porous ceramic material which allows fine air bubbles to escape from the said weight, further comprising means to hydraulically connect the center tube to said porous ceramic material serving as the weight located at the bottom portion of the center tube.

\* \* \* \* \*